United States Patent [19]

Kodali

[11] 4,306,000

[45] Dec. 15, 1981

[54] METHOD OF COOLING ZINC HALOGEN BATTERIES

[75] Inventor: Satyanarayana Kodali, Troy, Mich.

[73] Assignee: Energy Development Associates, Inc., Madison Heights, Mich.

[21] Appl. No.: 144,847

[22] Filed: Apr. 29, 1980

[51] Int. Cl.³ .......................................... H01M 2/38
[52] U.S. Cl. ..................................... 429/51; 429/70; 429/120
[58] Field of Search ................. 429/50, 51, 199, 70, 429/120

[56] References Cited

U.S. PATENT DOCUMENTS

| | | | |
|---|---|---|---|
| 3,713,888 | 1/1973 | Symons | 136/6 |
| 3,783,027 | 1/1974 | Bjorkman | 136/86 C |
| 3,793,077 | 2/1974 | Behling | 136/6 E |
| 3,809,578 | 5/1974 | Symons | 136/6 E |
| 3,907,592 | 9/1975 | Symons | 136/6 R |
| 3,908,001 | 9/1975 | Symons et al. | 423/472 |
| 3,935,024 | 1/1976 | Symons | 136/6 E |
| 3,940,283 | 2/1976 | Symons | 136/6 E |
| 3,993,502 | 11/1976 | Bjorkman, Jr. | 429/51 |
| 4,020,238 | 4/1977 | Symons | 429/15 |
| 4,072,540 | 2/1978 | Symons et al. | 429/70 |
| 4,115,529 | 9/1978 | Behling | 423/472 |
| 4,127,701 | 11/1978 | Symons et al. | 429/19 |

OTHER PUBLICATIONS

"Evaluation of a 1-kWh Zinc Chloride Battery System", Palo Alto, Cal.: Electric Power Research Inst., Sep. 1976 EM-249.
"Development of High Efficiency, Cost-Effective, Zinc-Chlorine Batteries for Utility Peak Shaving, 1976", Palo Alto, Cal.: Elec. Pow. Res. Inst., Mar. 1978 EM-711.
"Development of the Zinc-Chloride Battery for Utility Applications", Palo Alto, Cal.: Elec. Pow. Res. Inst., Apr. 1979, EM-1051.
"Development of the Zinc-Chlorine Battery for Utility Applications", Palo Alto, Cal.: Elec. Pow. Res. Inst., Apr. 1979 EM-1051, Part II.
Warde, Symons, Whittlesey & Catherino, "100-MWh Zinc-Chlorine Peak Shaving Battery Plants", Proceedings of the 13 Intersoc. Energy Conversion Engineering Conf., vol. I, 1978, pp. 755-763.
Whittlesey, Symons, Warde & Brummet, "The Zinc-Chlorine Battery in the BEST Facility: 1981", Proceedings of the 14th Intersoc. Energy Conv. Eng. Conf. vol. II, 1979, pp. 2059-2064.

Primary Examiner—Charles F. LeFevour
Attorney, Agent, or Firm—Harness, Dickey & Pierce

[57] ABSTRACT

This disclosure relates to a method of cooling zinc halogen batteries which involves the use of a liquid-overfeed cooling system utilizing a fluorocarbon refrigerant or the like. This new method is adaptable for use in either cooling the battery store water during charge so that a solid halogen hydrate will form, or for use in cooling the battery electrolyte, or both. This direct-cooling, liquid-overfeed system is especially suited for use with a series of batteries as is proposed for use in utility load leveling systems and provides several advantages over other conventional cooling alternatives including an improved coefficient of performance, better heat transfer and temperature control, and reduced capital cost.

11 Claims, 4 Drawing Figures

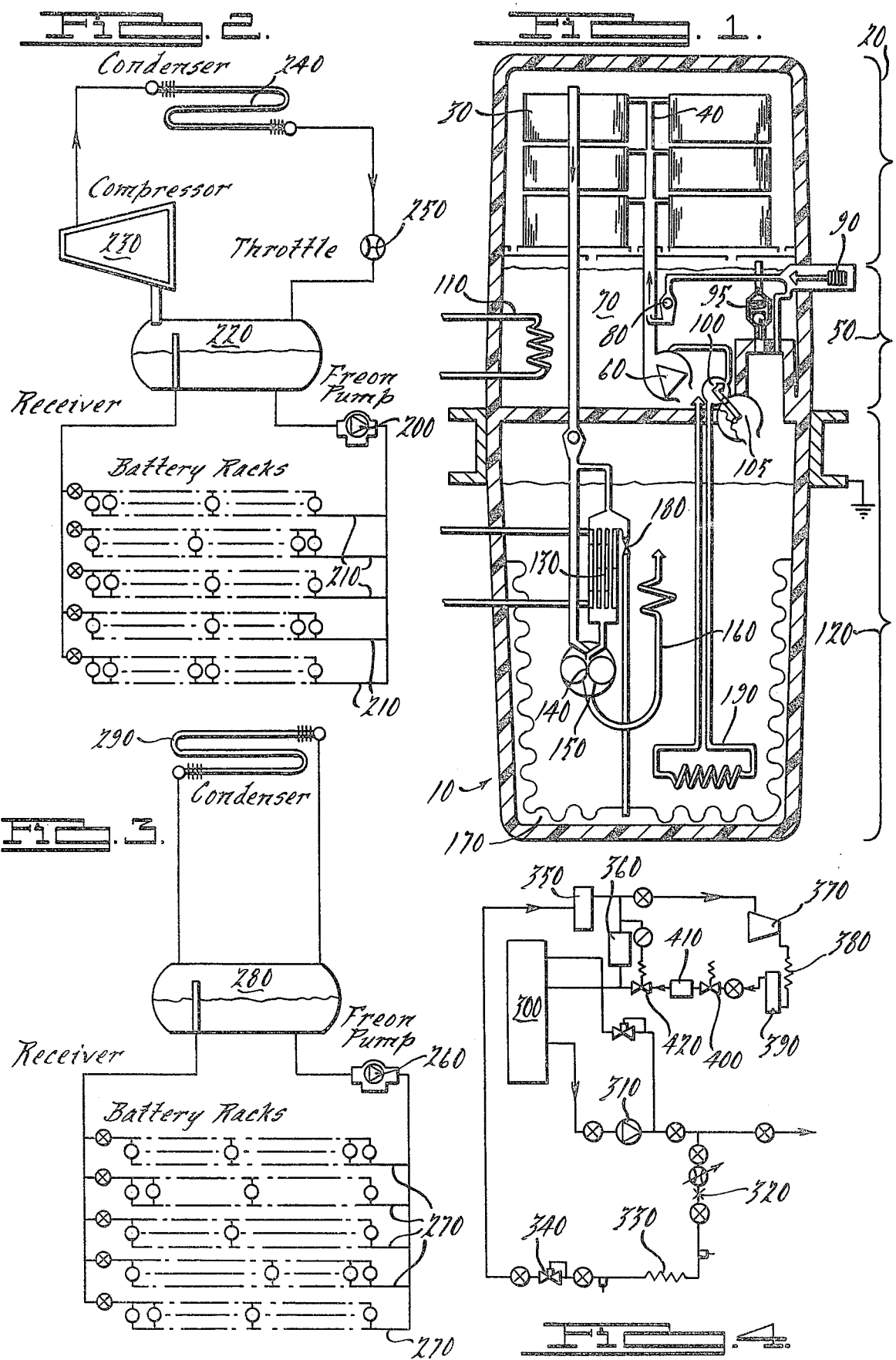

METHOD OF COOLING ZINC HALOGEN BATTERIES

BACKGROUND OF THE INVENTION

In its broad aspects, the present invention is directed to secondary electrical energy storage systems of the aqueous type. A metal halogen hydrate electrical energy storage system of the type to which the present invention is applicable is fully described in U.S. Pat. No. 3,713,888, entitled "Halogen Hydrates", issued Jan. 30, 1973. This patent is owned by the same assignee as the present invention and details thereof beyond those herein described are incorporated in this application by reference. Metal halogen hydrate electrical energy storage systems or secondary storage batteries are conveniently categorized as being of the high energy density (H.E.D.) type because of their capacity to supply upwards of 50 watt hours of electric power per pound of weight. This high electrical energy capacity coupled with the compactness and low weight of such secondary storage batteries has rendered them particularly satisfactory for use as principal and auxiliary sources of electrical energy in either mobile (electric vehicles) or stationary (utility load leveling) power plant systems.

The present invention pertains primarily to zinc halogen battery systems, and more particularly to zinc chlorine battery systems, although it should be appreciated that the invention described herein may be equally applicable to other metal halogen battery systems. The chemical reactions which occur in a zinc chloride hydrate battery are relatively straightforward. During charge, the electrolyte (a solution of zinc chloride in water) is flowed through the battery with the aid of a circulator. As electrical direct current is passed through the battery from an external source, zinc metal is electro-deposited on the negative electrode (typically relatively dense graphite) of the battery as a uniform, non-porous solid. Simultaneously, chlorine gas, generated at the positive electrode (typically porous graphite or ruthenia-catalyzed porous titanium) is carried away with the circulating electrolyte stream. Outside of the battery, the chlorine gas is admixed with water cooled to less than about 10° C. and a pale yellow solid called chlorine hydrate is formed. This reaction is exothermic with the heat of formation of chlorine hydrate being about −18 kCal/mole. Accordingly, the store area, where the solid chlorine hydrate ($Cl_2 \cdot xH_2O$) is retained separate from the battery, is chilled continuously during charge. During discharge, the aqueous zinc chloride electrolyte is circulated through the battery thereby carrying chlorine, which is slightly soluble in the electrolyte, to the chlorine electrode of the battery and permitting current to be withdrawn from the battery. To replace the chlorine in the electrolyte, the chlorine hydrate is heated in a controlled manner to release chlorine from the hydrate.

As noted above, one proposed use of the above-described zinc chloride battery is in what is called utility load leveling, in which case, a series of batteries would be used at an electrical power plant to store off-peak electric energy to be used during periods of peak demand. This alternative is especially attractive in view of the current increasing demand for electricity and the high cost and short supply of petroleum oil. In this load leveling application, several individual zinc halogen batteries or battery modules would be arranged in strings to provide the desired electrical output. For example, systems under consideration at the present time include a 4 MWh (megawatthour) system, which is based on the use of eighty battery modules; and a 100 MWh system, which is comprised of four 25 MWh units each consisting of four strings made of 120 series-connected battery modules.

At present, the control and operation of a single zinc chloride battery is fairly well developed with such considerations as individual battery cooling, electrical connections, electrical control, and the like having been investigated with several solutions having been proposed. But the control and operation of a series of batteries differs considerably from the operation of a single battery. For example, with regard to a single battery, it has been common to cool the battery hydrate store area using such materials as ice water, cold brine, or glycol solutions, with such materials as fluorocarbon refrigerant in a conventional evaporation cycle having been proposed. However, when batteries are connected in series, there is an electric potential between the batteries, and hence any cooling system used for the batteries has to be non-conducting or dielectric. In addition, as will be described in more detail hereinbelow, the battery electrolyte sump area also requires cooling. Thus conductive materials such as ice water or brine are unsatisfactory, although deionized water, which is a dielectric, has been proposed. But the use of deionized water as a coolant would require a totally separate means of cooling the deionized water, thus introducing considerable capital expense into the system for a separate refrigeration plant including such equipment as heat exchangers, additional valving, and the like. The same would be true for glycol solutions, which also have the drawback of being combustible. With regard to fluorocarbon refrigerants such as Freon, even though their use as a refrigerant for the hydrate store area of an individual battery has been suggested, such suggested use has been in terms of a conventional evaporation cycle (Freon liquid in and Freon vapor out), and even then has never actually been tested. More importantly, none of the other associated scale-up problems involving a series of batteries such as temperature control and other heat transfer factors have been considered and solved until the present invention.

Therefore, one of the objects of the present invention is to provide a method of cooling a series of batteries using a dielectric coolant such as fluorocarbon refrigerant or the like which not only functions as the coolant, but also is readily adaptable to a conventional refrigeration loop for regenerating the coolant.

Other objects, features and advantages of the present invention will become apparent from the subsequent description, and example, and the appended claims taken in conjunction with the accompanying drawings.

SUMMARY OF THE INVENTION

The benefits and advantages of the present invention are achieved by employing a method of cooling a series of zinc halogen batteries, such as those proposed for use in utility load leveling systems, which comprises the use of a direct-cooling, liquid-overfeed cooling system utilizing a fluorocarbon refrigerant or the like. The cooling system of the present invention is adaptable for use in either cooling the battery store water during charge so that solid halogen hydrate will form, or for use in cooling the battery electrolyte, or both.

BRIEF DESCRIPTION OF THE DRAWINGS

The foregoing objects and others will be pointed out more fully hereinafter in conjunction with the description of the preferred embodiments of the present invention illustrated in the accompanying drawings and examples and in which:

FIG. 1 is a schematic diagram of the functional components within a zinc chlorine battery module;

FIG. 2 is a schematic diagram of a direct-cooling, liquid-overfeed refrigeration system according to the present invention in use for cooling the hydrate store area of the battery modules;

FIG. 3 is a schematic diagram of a direct-cooling, liquid-overfeed cooling system according to the present invention in use to control battery electrolyte temperature; and FIG. 4 is a schematic diagram of a refrigeration system as referred to in the example hereinbelow.

DESCRIPTION OF THE PREFERRED EMBODIMENT

Referring now to the drawings wherein the showings are for the purpose of illustrating a preferred embodiment of the invention only and are not for the purpose of limiting the invention, FIG. 1 schematically shows the basic building block of a utility load leveling plant, namely an individual zinc chlorine battery module 10. Physically, the module presently contemplated for use in utility load leveling systems is about 4 feet square by about 5 feet high and is a self-contained electrochemical storage unit. The module 10 is divided into three compartments. At the top is a stack compartment 20 which contains six cell stacks or submodules 30 arranged in three tiers of two submodules each. Each stack comprises a comb-type construction of zinc electrodes and chlorine electrodes, with flowing electrolyte being supplied by a distribution manifold 40.

The next main section of the battery module 10 is the sump compartment 50 which is generally located in the center of the module. This compartment contains an electrolyte pump 60 which pumps electrolyte 70 through the distribution manifold 40. Also contained in this compartment is a chlorine supply check valve 80 and chlorine supply control valve 90, which valves, in conjunction with store pressure relief valve 95, decomposition regulating valve 100, and decomposition regulating valve controller 105, regulate the flow of chlorine gas into the manifold 40 from the compartment below. In terms of the present invention, the most important component in this sump compartment 50 is the sump heat exchanger or chiller 110 which is used to cool the electrolyte 70 contained in this compartment. As will be described in more detail hereinbelow, coolant flows through this heat exchanger 110 to cool the electrolyte 70, thereby cooling the sump compartment 50 and cell stacks 30 above. The coolant itself is replenished or cooled outside of the battery module.

The bottom section of the battery module 10 is the store compartment 120 located below the sump, where chlorine hydrate, $Cl_2 \cdot xH_2O$ is formed during charge, stored, and decomposed during discharge. This compartment contains a hydrate former heat exchanger or chiller 130 which is the most important component in this compartment in terms of the present invention. The chlorine used in the battery is formed and stored in this compartment at a temperature of about 10° C. The heat of hydrate formation, together with any other heat gains to the store, are removed by this hydrate former heat exchanger 130. Other components in this store compartment 120 include a hydrate former gas pump 140, hydrate former nozzle 150, hydrate formation tube 160, store filter 170, and filter suction line orifice 180. In addition, a decomposition heat exchanger 190, which is not strictly part of the method of the present invention, is used to heat the fluid in store compartment 120 during discharge of the battery, by circulating relatively warmer electrolyte 70 through it, to cause chlorine gas to be liberated from the chlorine hydrate stored therein. This liberated chlorine gas is then passed into the rest of the battery.

A battery module currently proposed for use in a 100 MWh utility load leveling application provides about 165,000 $cm^2$ of active electrode area, thereby determining that the module will be operated at about 544 amperes and will have a nominal capacity of about 52 kWh, dc energy delivered. The module 10 will be charged at about 22.6 volts and will discharge at an average of about 19.2 volts at the terminals. The electrolyte pump 60 is required to pump at the rate of about 5.5 l/sec (about 90 gpm) against a head of about 0.25 atm (about 3.5 psi) and will require approximately 340 watts (ac) for operation in both charge, and discharge. The gas pump 140 which operates only in charge, is required to pump about 1.7 l/sec maintaining a pressure differential of about 0.68 atm (about 10 psi) between the stack and store gas spaces with the stack gas space at about 0.6 atm and valve 90 closed. It is estimated that about 430 watts (ac) will be required for the gas pump. The chlorine is stored as chlorine hydrate in the store at about 10° C. The heat of hydrate formation, together with other heat gains to the store, is removed through the chiller heat exchanger 130, during charge, at a rate of about 2.5 kW (about 8530 Btu/h). The cell stacks and sump are cooled by means of the sump heat exchanger 110 at a rate of about 1.2 kW in charge and about 1.9 kW in discharge. The concentration of hydrogen will be maintained by recombination with chlorine at a level of about 0.1% by means of fluorescent lights in the stack compartment 20, requiring about 20 watts, ac.

As noted above, it is proposed that the overall 100 MWh utility load leveling system will contain four 25 MWh units each consisting of four strings with 120 series-connected modules in each string. The battery plant will charge at approximately 2712 volts and discharge at an average voltage of about 2304 volts (including bus losses). Each string will operate at about 544 amps, and thus the total bus current for the system will be about 2176 amps. Other specifics of the electrical system such as individual cell, submodule, stack, overall construction and other details of a 100 MWh utility load leveling system are believed to be outside the scope of the present invention and for that reason are not specifically discussed herein. However, reference may be had to various EPRI (Electric Power Research Institute) publications including "Evaluation of a 1-kWh Zinc Chloride Battery System" Palo Alto, Calif.: Electric Power Research Institute, September 1976, EM-249; "Development of High Efficiency, Cost-Effective Zinc-Chlorine Batteries for Utility Peak Shaving, 1976" Palo Alto, Calif.: Electric Power Research Institute, March 1978, EM-711; "Development of the Zinc-Chlorine Battery for Utility Applications" Palo Alto, Calif.: Electric Power Research Institute, April 1979, EM-1051; and "Development of the Zinc-Chlorine Battery for Utility applications" Palo Alto, Calif.: Electric Power Research Institute, April 1979, EM-1051, Part II; the disclosures of which are hereby incorporated by reference. Reference may also be had to two publications from the Intersociety Energy Conversion Engineering Conference including C. J. Warde, P. C. Symons, C. C. Whittlesey, and H. A. Catherino, "100-MWh Zinc-Chlorine Peak Shaving battery Plants" In proceedings of the 13th Intersociety Energy Conversion Engineering Conference, Vol. I 1978, p. 755-763; and C. C. Whittlesey, P. C. Symons, C. J. Warde, and B. D. Brummet, "The Zinc-Chlorine Battery In The BEST Facility: 1981" In Proceedings of the 14th Intersociety Energy Conversion Engineering Conference, Vol. II, 1979, p. 2059-2064; the disclosures of which are hereby also incorporated by reference. It should also be appreciated that the battery module itself may contain other components, such as other valves, motors, battery terminals, hose connections, inerts-rejection devices, a hydrogen-chlorine recombination reactor such as the fluorescent lights referred to earlier, and a stack pressure measuring transducer, all of which are believed to be outside the scope of this invention, and the further detailed disclosure of which is believed to be unnecessary to the practice of the present invention.

Cooling of the store compartment 120 is required during charge for hydrate formation, and cooling of the sump compartment 100 is required during both charge and discharge. The heat generated in the stack is continuously transported to the sump by the circulation of electrolyte. This heat must be removed continuously to maintain a predetermined sump temperature since wide deviations in sump temperature will result in the reduction of electrochemical efficiency. During the charge cycle, the chlorine generated in the stack is transferred to the store and mixed with chilled water to form hydrate. This is an exothermic reaction and unless the store cooling rate is matched with the rate of chlorine generation, the system will develop internal pressure imbalance.

Hydrate formation occurs in the store at about 9.6° C. As this is usually below the normal ambient temperature, heat removal at this temperature requires refrigeration. On the other hand, the sump is to be maintained at about 30° C. during charge and about 45° C. during discharge. Both these temperatures are above the normal ambient wet-bulb temperature in almost all parts of the United States suitable for such utility load leveling systems, so the sump can be cooled directly without any refrigeration. Such cooling may occasionally push the sump temperature during charge a few degrees above the desired level (about 30° C.). However, the savings realized by eliminating refrigeration for sump cooling outweighs the occasional minor energy losses caused by increased sump temperature. Hence, it is desired to use refrigeration for store chilling only and direct cooling (thermocycling) for sump cooling.

It has been proposed to provide a centralized cooling and refrigeration system for cooling the battery unit. All the modules in the unit are interconnected through the cooling equipment. As there is a large potential difference between modules interconnected by the coolant piping, it is essential to electrically isolate each of the modules from the cooling system. To achieve this, both the coolant and piping must be isolated electrically from the modules. Module heat exchangers are connected to the distribution pipes on the rack through hoses made of dielectric material. Two coolant alternatives, deionized water and fluorocarbon refrigerant have been analyzed since both may be considered functional dielectrics. However, as described earlier, the latter offers several advantages over the former and, hence, is greatly preferred. It should be kept in mind that although the cooling system of the present invention is described with regard to a series of zinc chloride batteries, it may also be applicable to other battery systems which are connected in series and require cooling.

FIG. 2 is a simplified schematic of a direct-cooling, liquid-overfeed system for use in cooling the store compartment 120 of each battery module set up in the battery racks of a utility load leveling plant. An abundant supply of a liquid fluorocarbon refrigerant such as Freon or Refrigerant-12 is pumped by Freon pump 200 to each string 210 of battery modules and distributed to the store compartment of every module. Heat is absorbed at whatever rate is required by vaporizing some portion of the liquid passing through the heat exchanger (130 in FIG. 1). This process takes place at a constant temperature established by regulating the outlet manifold pressure. Vapor and liquid are returned to a central receiver 220 where the appropriate equilibrium temperature and pressure are maintained by a standard refrigeration compressor 230, condenser 240, and throttle valve loop 250. The overall coefficient of performance for this entire system at design specifications has been calculated to be close to about 4.5. This coefficient of performance refers to the cooling effect of the refrigerator in btu divided by the energy input to the refrigerator motor in btu. It has surprisingly been found that the use of a liquid overfeed system, namely one in which Freon liquid goes in and a liquid-vapor mixture come out, provides greatly improved heat transfer properties and significantly better temperature control than a conventional Freon evaporation cycle where Freon liquid goes in and Freon vapor comes out.

As schematically shown in FIG. 3, battery cooling will be accomplished by removing heat from the electrolyte sump compartment 50 of each battery set up in the battery racks of a utility load leveling system with a system very similar to that described in connection with FIG. 2. However, since the operating temperature desired here is close to about 40° C., no refrigerant compressor is required. At this temperature, vaporized Freon can be condensed directly in an evaporative-type cooling tower. This provides a very attractive scheme for keeping the battery cool, and is possible because of contemplated ambient weather conditions, as referred to earlier.

As shown in FIG. 3, an abundant supply of a liquid fluorocarbon refrigerant such as Freon is pumped by Freon pump 260 to each string 270 of battery modules and distributed to the sump compartment of every module. Heat is absorbed by vaporizing some portion of the liquid passing through the heat exchanger. As noted above in connection with the system of FIG. 2, this process takes place at a constant temperature established by regulating the outlet manifold pressure. Vapor and liquid are returned to a central receiver 280 where the appropriate equilibrium temperature and pressure are maintained by a standard condenser or evaporative-type cooling tower 290. Again, the same surprising improved heat transfer properties and better temperature control occur with this liquid overfeed system.

In order to further illustrate the invention, the following example is provided. It is to be understood, however, that the example is included for illustrative purposes and is not intended to be limiting of the scope of the invention as set forth in the subjoined claims.

EXAMPLE

A direct-cooling, liquid-overfeed refrigeration system was set up for the test and evaluation. The schematic of the refrigeration unit is shown in FIG. 4. The system was built around a conventional Tecumseh Products Co. Model CG4075 condensing unit. Freon, at required temperature, was held in a low-pressure receiving tank 300. A vane pump 310 was used to pump the liquid Freon from the receiving tank 300 through a fixed orifice 320 and into a heat exchanger 330. (This heat exchanger compares to those indicated as 110 and 130 in FIG. 1). In a refrigeration system for a commercial battery plant a number of heat exchangers would be connected in parallel and to ensure uniform distribution of refrigerant in each heat exchanger, an adjustable orifice would be added before each heat exchanger. In the present experimental system, the orifice 320 was used to simulate the conditions that will exist in a proposed commercial utility load leveling system. After the Freon enters the heat exchanger, the heat transferred to it from the water first raises its temperature and then causes boiling to take place. The flow of liquid refrigerant was selected such that at the design level, one-third of the Freon was evaporated and the rest left the heat exchanger as liquid. Thus the exiting fluorocarbon refrigerant comprised two parts by weight of liquid and one part by weight vapor. This liquid gas mixture went through an evaporator pressure regulator 340 to a liquid-gas separator 350, from where the liquid was returned to low pressure Freon holding tank or quiet well 360, and the vapor flowed into the compressor 370. The vapor was compressed and condensed in an air cooled condenser 380 from where it flowed into a holding tank or receiver 390. Before entering the low-pressure receiver 300, it flowed through a solenoid controlled expansion valve 400 which reduced the pressure to the desired level, and it also flowed through a dryer 410. In the present system, the expansion valve also controlled the Freon level in the low-pressure receiver tank by using a level-master level sensor 420. Other miscellaneous valves and like components are as shown in FIG. 4 or are believed to be well within the expertise of one skilled in this art. For example, an oil separator component and heated oil reserve may be added to the system, as is common in many conventional Freon refrigeration systems.

The tests conducted suggest that spiral-type and flat-plate-type heat exchangers are the best suited for the present application. Also, a titanium platecoil heat exchanger was considered in which the plates were immersed in the solution and cooling or heating fluid flowed through the platecoil. A titanium tube-in-tube heat exchanger was also tested and was coated with Union Carbide High-Flux surface (a special surface coating) to provide enhanced surface for boiling. Test results from a platecoil heat exchanger are intended to be used to design a platecoil heat exchanger which should meet the specifications for a utility load leveling system battery module. Tests conducted on a heat exchanger utilizing Union Carbide High-Flux boiling surface indicated that this surface was highly effective in enhancing the heat transfer coefficient on the Freon side. Use of this coating will significantly reduce the required surface area and, hence, the cost. At present, the High-Flux surface is being used only on the outside surface of tubes and is not believed to be commercially used on flat surfaces.

In view of the drawbacks of other conventional cooling systems, as referred to earlier, and especially in view of the drawbacks of the use of deionized water as a non-conducting coolant fluid, a fluorocarbon refrigerant is believed to present several advantages. (As used herein, the term "fluorocarbon" refers to fluorocarbon, chlorofluorocarbon, and other halogenated hydrocarbon refrigerants of the type well-known in the art, and includes such materials as Freon, Genetron, dichlorodifluoromethane (Refrigerant-12), chlorodifluoromethane (Refrigerant-22), and the like. In a fluorocarbon refrigerant system, the fluid remains non-conductive even when it is slightly contaminated. This is unlike deionized water which becomes unsuitable when it is even slightly contaminated by various system contaminants, such as contaminants from piping material or the like. In a fluorocarbon refrigerant system, there is no need for a secondary cooling loop to replenish or "cool" the coolant, since the fluorocarbon refrigerant itself is used throughout the system. When deionized water is used, an additional refrigeration system is necessary, thus involving additional heat exchangers and increased system costs. In a fluorocarbon refrigerant system, only one fluid is used throughout, thereby presenting many economies of scale and less complexity. Also, in a fluorocarbon refrigerant system, the coefficient of performance of the system will be higher than with a deionized water system. This is because in a deionized water system the suction pressures on the compressor will be low and hence the compression work will be higher, or the system efficiency will be lower; whereas in the present fluorocarbon refrigerant system the compressor operates at higher suction pressure thereby resulting in a reduction in work and improved coefficient of performance. In addition, deionized water must also be continuously deionized.

The direct-cooling, liquid-overfeed fluorocarbon refrigerant system of the present invention is preferred over other possible alternatives because of the other following advantages. First, it is possible to maintain nearly constant temperature in module heat exchangers which is important for proper hydrate formation. As noted above, this and other improved heat transfer and temperature control properties are believed to be attributable to the liquid overfeed system of the present invention. Second, fluorocarbon refrigerant is a non-conducting fluid. This is a necessity where metal heat exchangers in each module are at different voltage levels but on a common network and thus must be electrically isolated from each other. Third, smaller size heat exchangers are possible which present important cost factors since these are normally made from costly titanium to resist corrosive environment inside the battery. And fourth, it is possible to reduce the size of the distribution pump and piping, and to eliminate the large central evaporator heat exchanger otherwise necessary.

While it will be apparent that the preferred embodiments of the invention disclosed are well calculated to fulfill the objects above stated, it will be appreciated that the invention is susceptible to modification, variation, and change without departing from the proper scope or fair meaning of the subjoined claims.

What is claimed is:

1. A method of cooling a plurality of zinc halogen battery modules connected electrically in series, each of said modules including heat exchanger means for enabling heat to be removed from the module by transferring heat to coolant flowing through the heat exchanger means, said method comprising:

connecting said modules together so that coolant flows in parallel through the heat exchanger means of each module, flowing a coolant comprising liquid fluorocarbon refrigerant into the heat exchanger means of each of said modules, and controlling said coolant to provide a liquid overfeed condition so that said coolant exits said heat exchanger means as a liquid and vapor mixture of fluorocarbon refrigerant.

2. The invention of claim 1 wherein the outlet manifold pressure of said coolant is controlled.

3. The invention of claim 1 wherein said fluorocarbon refrigerant is a material selected from the group consisting of dichlorodifluoromethane and chlorodifluoromethane.

4. A method of cooling a plurality of zinc chlorine battery modules connected electrically in series, each of said modules including heat exchanger means for enabling heat to be removed from the module by transferring heat to coolant flowing through the heat exchanger means, said method comprising:

connecting said modules so that coolant flows in parallel through the heat exchanger means of each module, flowing a coolant comprising liquid fluorocarbon refrigerant into the heat exchanger means of each of said modules, and controlling said coolant to provide a liquid overfeed condition so that said coolant exits said heat exchanger means as a liquid and vapor mixture of fluorocarbon refrigerant.

5. The invention of claim 4 wherein the outlet manifold pressure of said coolant is controlled.

6. The invention of claim 4 wherein said fluorocarbon refrigerant is a material selected from the group consisting of dichlorodifluoromethane and chlorodifluoromethane.

7. A method of cooling a plurality of zinc chlorine battery modules connected electrically in series, each of said modules including heat exchanger means in a fluid-containing store compartment within the module for enabling heat to be removed from fluid in the store compartment by transferring heat to coolant flowing through the heat exchanger means, said method comprising:

connecting said modules so that coolant flows in parallel through the heat exchanger means of each module, flowing a coolant comprising liquid fluorocarbon refrigerant into the heat exchanger means of each of said modules, and controlling said coolant to provide a liquid overfeed condition so that said coolant exits said heat exchanger means as a liquid and vapor mixture of fluorocarbon refrigerant.

8. A method of cooling a plurality of zinc chlorine battery modules connected electrically in series, each of said modules including heat exchanger means in an electrolyte-containing sump compartment within the module for enabling heat to be removed from the electrolyte in the sump compartment by transferring heat to coolant flowing through the heat exchanger means, said method comprising:

connecting said modules so that coolant flows in parallel through the heat exchanger means of each module, flowing a coolant comprising liquid fluorocarbon refrigerant into the heat exchanger means of each of said modules, and controlling said coolant to provide a liquid overfeed condition so that said coolant exits said heat exchanger means as a liquid and vapor mixture of fluorocarbon refrigerant.

9. A method of cooling a plurality of zinc halogen battery modules connected electrically in series, each of said modules including first heat exchanger means in a fluid-containing store compartment within the module, and also including second heat exchanger means in an electrolyte-containing sump compartment within the module, both of said heat exchanger means enabling heat to be removed from each of the respective compartments within the module by transferring heat to coolant flowing through each of said heat exchanger means, said method comprising:

connecting said modules so that coolant flows in parallel through each of the heat exchanger means of each module, flowing a coolant comprising liquid fluorocarbon refrigerant into each of the heat exchanger means of each of said modules, and controlling said coolant to provide a liquid overfeed condition so that said coolant exits each of said heat exchanger means as a liquid and vapor mixture of fluorocarbon refrigerant.

10. The invention of claim 9 wherein said fluorocarbon refrigerant is a material selected from the group consisting of dichlorodifluoromethane and chlorodifluoromethane.

11. The invention of claim 9 wherein said liquid and vapor mixture of fluorocarbon refrigerant comprises about two parts by weight of liquid to about one part by weight of vapor.

* * * * *